United States Patent [19]

Hirayama et al.

[11] Patent Number: 5,263,180
[45] Date of Patent: Nov. 16, 1993

[54] SPACE DIVERSITY RECEPTION SYSTEM

[75] Inventors: Eiichi Hirayama; Isamu Umino, both of Ohtawara, Japan

[73] Assignee: Fujitsu Limited, Kawasaki, Japan

[21] Appl. No.: 637,131

[22] Filed: Jan. 3, 1991

[30] Foreign Application Priority Data

Jan. 18, 1990 [JP] Japan .................................. 2-7059

[51] Int. Cl.[5] ............................................ H04B 17/02
[52] U.S. Cl. .................................. 455/139; 455/245.2; 455/273; 455/276.1
[58] Field of Search ................ 455/137, 138, 139, 140, 455/234.1, 245.2, 247.1, 253.2, 273, 276.1; 375/98, 102

[56] References Cited

U.S. PATENT DOCUMENTS

| 2,975,275 | 3/1961 | Adams | 455/138 |
| 3,540,055 | 11/1970 | Takagi | 455/139 |
| 4,386,435 | 5/1983 | Ulmer et al. | 455/139 |

FOREIGN PATENT DOCUMENTS

| 3003820 | 2/1980 | Fed. Rep. of Germany |
| 308111A1 | 2/1982 | Fed. Rep. of Germany |

OTHER PUBLICATIONS

Patent Abstracts of Japan, vol. 13, No. 92, Mar. 3, 1989.

Primary Examiner—Reinhard J. Eisenzopf
Assistant Examiner—Andrew Faile
Attorney, Agent, or Firm—Staas & Halsey

[57] ABSTRACT

In a space diversity reception system, a plurality of receiving circuits, each of which is connected to respective antenna, outputs a first type signal having a level which varies in accordance with the radio frequency signal level input to the receiving circuit. An automatic gain-controlled amplifier amplifies the first type signal so as to output a second type signal having a substantially constant level. A phase control circuit detects a phase difference between the second type signal output from each of the automatic gain-controlled amplifiers and controls the phase difference in each of the first type signals to be null. A combining circuit combines the signals, whose levels are respectively following the input radio frequency signal levels, picked up from each of an inter-stage in the receiving circuits, an output of the combining circuit is the output of the space diversity system. This circuit configuration allows an employment of a less expensive automatic gain-controlled amplifier requiring less severe characteristics. Thus, a circuit for adjusting the input levels to the combining circuit can be avoided, accordingly, a multi-level quadrature amplitude modulation signal having amplitude-modulated component can be received.

7 Claims, 7 Drawing Sheets

SPACE DIVERSITY RECEPTION SYSTEM

BACKGROUND OF THE INVENTION

1. Field of the Invention

The present invention relates to a space diversity (referred to hereinafter as SD) reception system of a radio signal. More particularly, this invention relates a SD reception system which is simple in its configuration and requires less severe specifications for its automatically gain-controlled intermediate frequency amplifier (referred to hereinafter as IF AGC amplifier).

2. Description of the Related Art

For receiving a radio signal of a digital radio equipment, etc., SD reception systems have been widely employed, where outputs of a first receiver for receiving a signal from a first antenna and a second receiver for receiving a signal from a second antenna are combined to attain a stable receiving signal even when the conditions of the received signals by the antennas are fluctuating due to a fading or multipath effect, etc., so that the signal is reliably received.

FIG. 1 shows a prior art SD reception system. The numerals 1 and 11 respectively denote microwave low-noise pre-amplifiers (MFA); the numerals 2 and 12 respectively denote microwave variable attenuators (MVA); the numerals 3 and 13 respectively denote frequency converters (FC); the numerals 4 and 14 respectively denote intermediate-frequency amplifiers (referred to hereinafter as IF amplifiers) (IFA); the numerals 5 and 15 respectively denote automatically gain-controlled (referred to hereinafter as AGC) amplifiers; the numerals 6 and 16 respectively denote amplitude detectors (DET); the numerals 7 and 17 respectively denote direct-current (DC) amplifiers (DCA); the numerals 8 and 18 respectively denote level monitor detectors (DET); the numeral 9 and 19 respectively denote band-pass filters (BPF) of the IF band; the numeral 21 denotes a microwave local frequency oscillator (LO); the numeral 22 denotes a microwave hybrid junction (H); the numeral 23 denotes a microwave endless Phase shifter (EPS); the numeral 24 denotes a phase control circuit (PHC); the numeral 25 denotes a phase comparator (PC) of the IF band; the numeral 26 denotes a 90° phase shifter (PS) of the IF band; the numerals 27~29 respectively denote DC amplifiers; the numerals 30 and 31 respectively denote variable attenuators (IVA) of the IF band; the numeral 32 denotes a hybrid junction (H) of the IF band; the numeral 33 denotes a third AGC amplifier of the IF band; the numeral 34 denotes an amplitude detector (DET); and the numeral 35 denotes a DC amplifier (DCA).

Microwave signals received by a first antenna ANT 1 and a second antenna ANT 2 are amplified by pre-amplifiers 1 and 11, respectively; the output signal levels therefrom are adjusted by variable attenuators 2 and 12; the output signals therefrom are converted into IF signals by frequency converters 3 and 13 with the local oscillator frequency; and the IF signals are amplified by IF amplifiers 4 and 14, which are of low-noise amplifiers. The IF signals output from IF amplifiers 4 and 14 are respectively amplified by AGC amplifiers 5 and 15, where detectors 6 and 16 output DC signals varying in accordance with the output levels of AGC amplifiers so as to form feedback loops via DC amplifiers 7 and 17 to variable attenuators 2 and 12 as well as AGC IF amplifiers 5 and 15; accordingly, outputs of AGC amplifiers 5 and 15 are kept constant even when the input levels thereto are fluctuated. Monitoring of the levels of the received signals are individually carried out by observing each of the AGC voltages, or by detectors 8 and 18 detecting the signal levels at inter-stage of AGC amplifiers 5 and 15.

Each of the IF signals is co-phased with each other as follows. Outputs of AGC IF amplifiers 5 and 15 are input to narrow-band bandpass filters 9 and 19 so as to allow carrier components of the IF signals input thereto to pass. Output of bandpass filter 9 is input directly to phase comparator 25, while output of another bandpass filter 19 is input via a 90° phase shifter 26 to phase comparator 26, where the phases of the IF signals input thereto are compared so as to output the phase difference therebetween. Thus detected phase difference is applied via phase controller 24 to endless phase shifter 23 so as to adjust phase of the local oscillator signal to be input from hybrid junction 22 to frequency converter 13, while output of local oscillator 21 is directly input from hybrid junction 22 to frequency converter 3, so that the phases of the two IF signals output from two AGC IF amplifiers 5 and 15 are always kept in phase with each other.

Furthermore, on the other hand, the outputs of AGC IF amplifiers 5 and 15 to be combined by hybrid junction 32 are attenuated by first and second variable attenuator 30 and 31, respectively, to adjust the signal levels as described below. Differential amplifier 27 detects the difference of the AGC voltages respectively generated for two AGC IF amplifiers 5 and 15; and the detected difference is amplified by DC amplifiers 28 and 29, one of which outputs an opposite polarity signal of the other. Outputs of DC amplifiers 28 and 29 control attenuation of first and second variable attenuators 30 and 31, respectively, so that the IF signal levels input to hybrid junction 32 are corresponding to the microwave signal levels received by the first and second antennas, ANT 1 and ANT 2, respectively. In other words, when the microwave signal level received by first antenna ANT 1 is higher than that of the second antenna ANT 2, the attenuation by first variable attenuator 30 is adjusted to be less than that of second variable attenuator 31. This is because, if the outputs of the same level from two AGC IF amplifiers 5 and 15 are combined by hybrid junction 32, the distortion or low SIN ratio carried in the signal of the lower level is included in the combined signal by fifty-fifty share. Therefore, the inputs to the hybrid junction 32 must be adjusted so that the inputs to the hybrid junction follow the input levels of respective antennas.

The combined IF signal output from hybrid junction 32 is amplified by third AGC IF amplifier 33. Detector 34 detects signal level of third AGC IF amplifier 33 so as to output a DC signal varying in accordance with the output signal level of third AGC IF amplifier 33. The output DC signal is fed back via a DC amplifier 35 to third AGC IF amplifier 33, so that the output level of third AGC IF amplifier 33 is stabilized constant.

In the prior art SD reception system shown in FIG. 1, there are the following problems. That is, as many as three AGC IF amplifiers 5, 15 and 33 are required; furthermore, the specifications required in these amplifiers are severe because they are employed in the main signal route, where linearity characteristics, phase characteristics as well as saturation characteristics are strictly required. Moreover, the IF signals once amplified by AGC IF amplifiers 5 and 15 must be attenuated at the expense of the additional variable attenuators 30 and 31 and control circuits 27-29 therefor.

SUMMARY OF THE INVENTION

It is a general object of the invention, therefore to provide a less expensive space diversity reception system, where the amplifiers provided for its phase control circuit requires less severe characteristics, as well as no particular control circuit is required for adjusting signal levels of the two receiver circuits to be combined.

In a space diversity reception system, according to the present invention, a plurality of receiving circuits, each of which is connected to respective antenna, outputs a first type signal having a level which varies in accordance with the radio frequency signal level input to the receiving circuit, and further includes an automatically gain-controlled (AGC) amplifier for amplifying the first type signal so as to output a second type signal having a substantially constant level. The space diversity reception system further has a phase control circuit for detecting a phase difference between the second type signals output from each of the AGC amplifiers and for controlling the phase difference in the two first type signals to be null, and a combining circuit for combining the signals, whose levels are respectively following the input radio frequency signal levels, picked up from each of an inter-stage in the receiving circuits. Output of the combining circuit is the output of the SD system. This circuit configuration allows an employment of a less expensive AGC amplifier requiring less severe characteristics and deletion of the circuit for adjusting the input levels to the combining circuit.

The above-mentioned features and advantages of the present invention, together with other objects and advantages, which will become apparent, will be more fully described hereinafter, with reference being made to the accompanying drawings which form a part hereof, wherein like numerals refer to like parts throughout.

DESCRIPTION OF THE PREFERRED EMBODIMENTS

Figure 2:
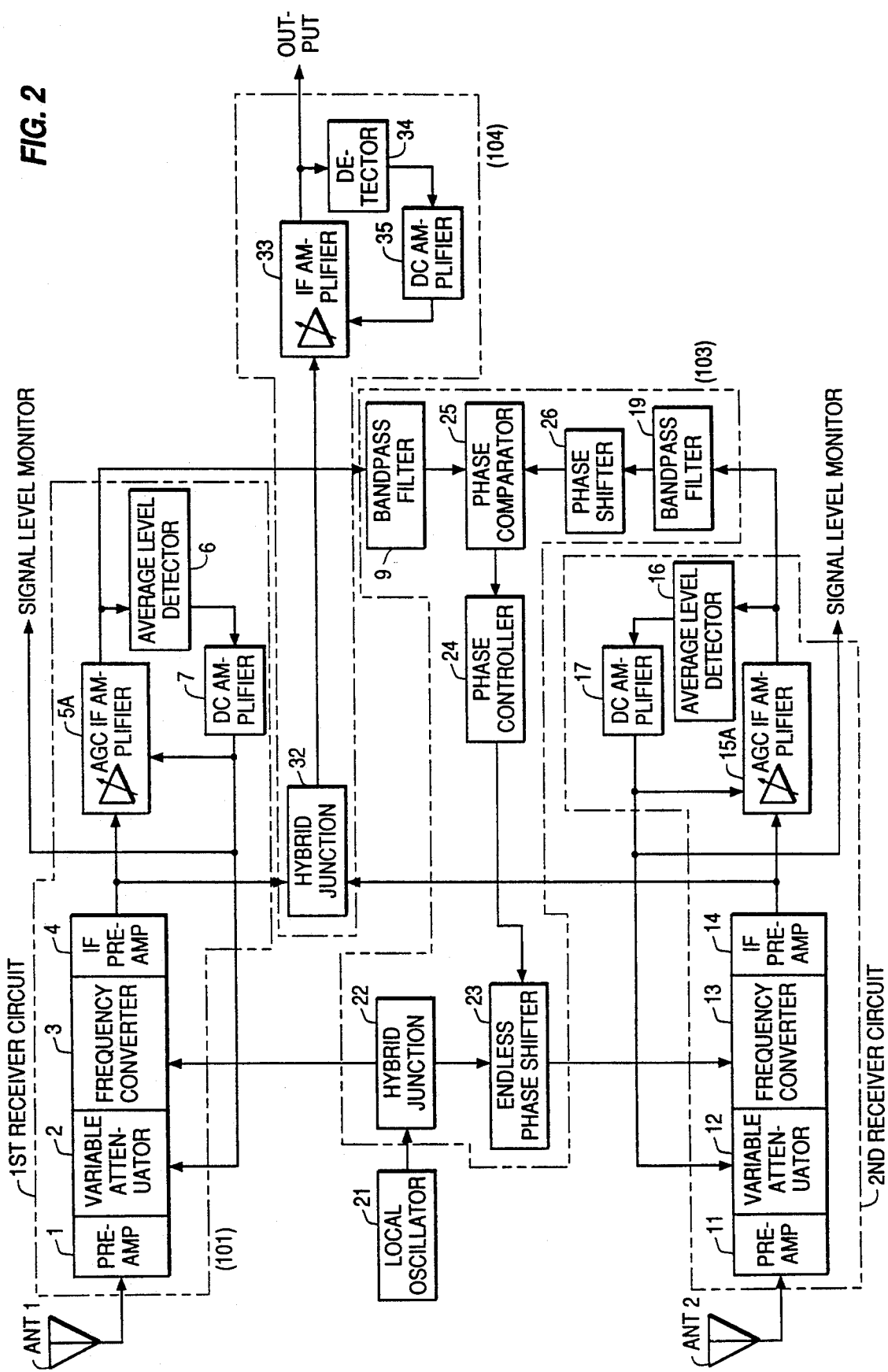
FIG. 2 shows a block diagram of a first preferred embodiment the present invention.
Figure 6:
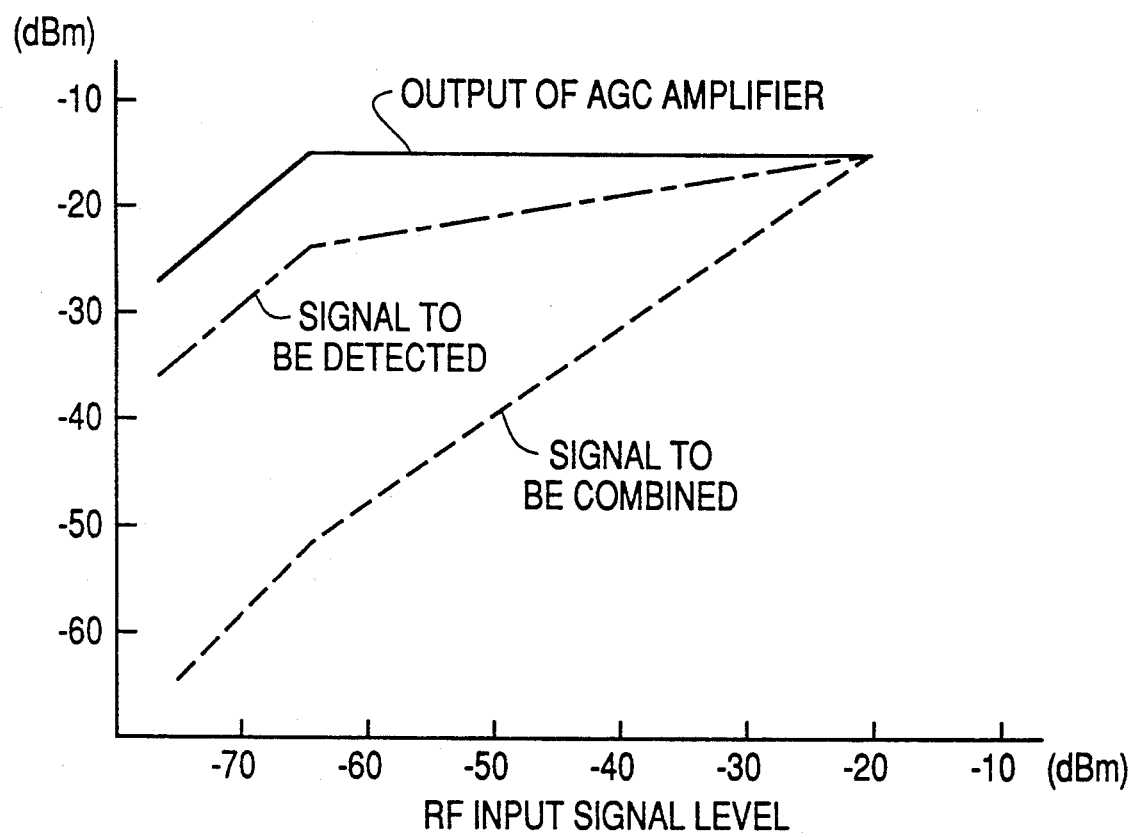
FIG. 6 shows output level of the AGC IF amplifier, signal level to be combined and signal level to be monitored, versus the input signal level to the receiver.

FIG. 2 shows a block diagram of a first preferred embodiment of the present invention. Microwave signals received by first and second antenna ANT 1 and ANT 2 are respectively amplified by microwave low-noise pre-amplifiers 1 and 11, outputs from which are attenuated respectively by variable attenuators 2 and 12 for some degree according to an AGC voltages fed back from outputs of AGC IF amplifiers 5A and 15A, as explained later in detail. Outputs from variable attenuators 2 and 12 are frequency-converted by frequency converter 3 and 13 with local frequency signals input thereto from a local oscillator 21 via hybrid junction 22, so as to be respectively output as IF signals. Details of the local frequency signals are described later on. Outputs from frequency converter 3 and 13 are amplified by low-noise IF pre-amplifiers 4 and 14, respectively. Degree of the AGC fed back to the variable attenuators 2 and 12 are only for preventing a distortion or a noise caused from too week a signal or too strong a signal input to frequency converters 3 and 13; therefore, the output signal levels from IF amplifiers 4 and 14 are varying in accordance with the levels of the microwave signals received by the antennas, respectively, as shown in FIG. 6. Variable attenuators 2 and 12 are of widely known circuit typically employing PIN diodes to which the AGC voltage is applied.

IF signals output from IF amplifiers 4 and 14 are further amplified by AGC IF amplifiers 5A and 15A, where their output levels are automatically gain-controlled respectively, as shown in FIG. 6. For the AGC amplification, detectors 6 and 16 detect average levels of the outputs of AGC IF amplifiers 5A and 15A, so as to output signals in accordance with the output levels of the AGC IF amplifiers 5A and 15A, respectively. DC amplifiers 7 and 17 amplify the output of detectors 6 and 16, outputs of which are negatively fed back to variable attenuators 2 and 12 and AGC IF amplifiers 5A and 15A to control their gains, respectively. Though no drawing is shown in the figure, there may be provided a reference voltage source to which the output of the detector 6 (or 16) is compared, where the detected difference is employed as the AGC voltage. This feedback circuit provides more constant output level from the AGC IF amplifiers. Then, AGC loops, i.e. feedback loops, are established so that the output levels of AGC IF amplifiers 5A and 15A are respectively kept substantially constant. Thus, the circuits from pre-amplifier 1 through AGC IF amplifiers 5A constitute a first receiver circuit for first antenna ANT 1, as well as the circuits from pre-amplifier 11 through AGC IF amplifiers 15A constitute a second receiver circuit for second antenna ANT 1.

Microwave signal levels received by the receiver circuits are individually monitored by observing each of the AGC voltages independently for each receiver circuit.

Out of the outputs of AGC IF amplifiers 5A and 15A of the constant level, carrier frequency spectrums are extracted by narrow bandpass filters 9 and 19, respectively. Output of bandpass filter 9 of the first receiver circuit is directly input to a phase comparator 25, while output of bandpass filter 19 of the second receiver circuit is input via a 90° phase shifter 26 to phase comparator 25, where phases of the two carrier spectrums are compared. Phase comparator 25 is formed of an analog multiplier circuit of the 90°-shifted two signals as well known, where the signals to be compared must be of equal level in order to achieve accurate phase-comparison. The phase difference output from phase comparator 25 is applied via phase controller 24 to endless phase shifter 23 to adjust phase of the local oscillator signal to be input from hybrid junction 22 to frequency converter 13 of the second receiving circuit, while output of local oscillator 21 is directly input via hybrid junction 22 to frequency converter 3 of the first receiving circuit, so that the phases of the two IF signals output from two frequency converters 3 and 13 are always kept co-phase with each other.

Thus co-phased IF signals output from IF amplifiers 4 and 14 are, on the other hand, are input to hybrid junction 32, where the two IF signals are combined, i.e. added. Output of hybrid junction 32 is amplified by a third IF amplifiers 33. Detector 34 detects the out-.out of third IF amplifier 33 so as to output a signal which corresponds to the average output level thereof. Output of detector 34 is amplified by a DC amplifier 34, output of which is negatively fed back to third IF amplifier 33 so that the output of third IF amplifier 33 is automatically gain-controlled to be substantially constant even when the input signal level thereto fluctuates.

Figure 3A:
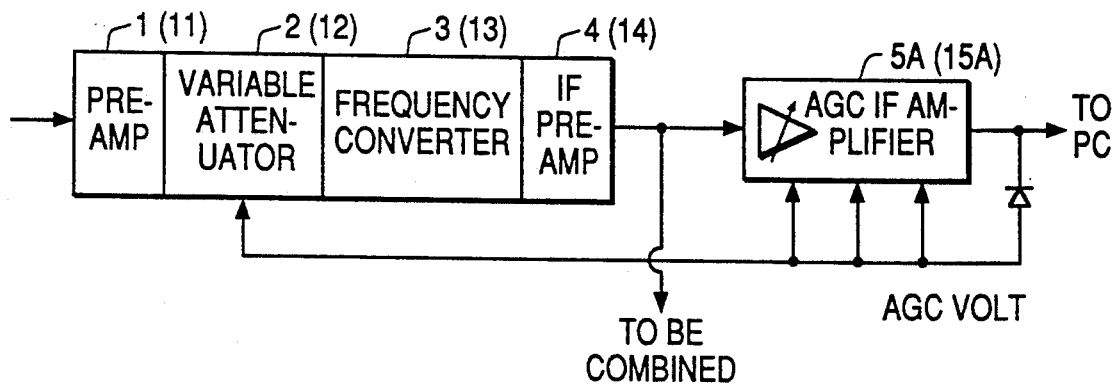
FIGS. 3(A) and 3(B) show a level diagram of the signals in the FIG. 2 first preferred embodiment circuit.
Figure 3B:
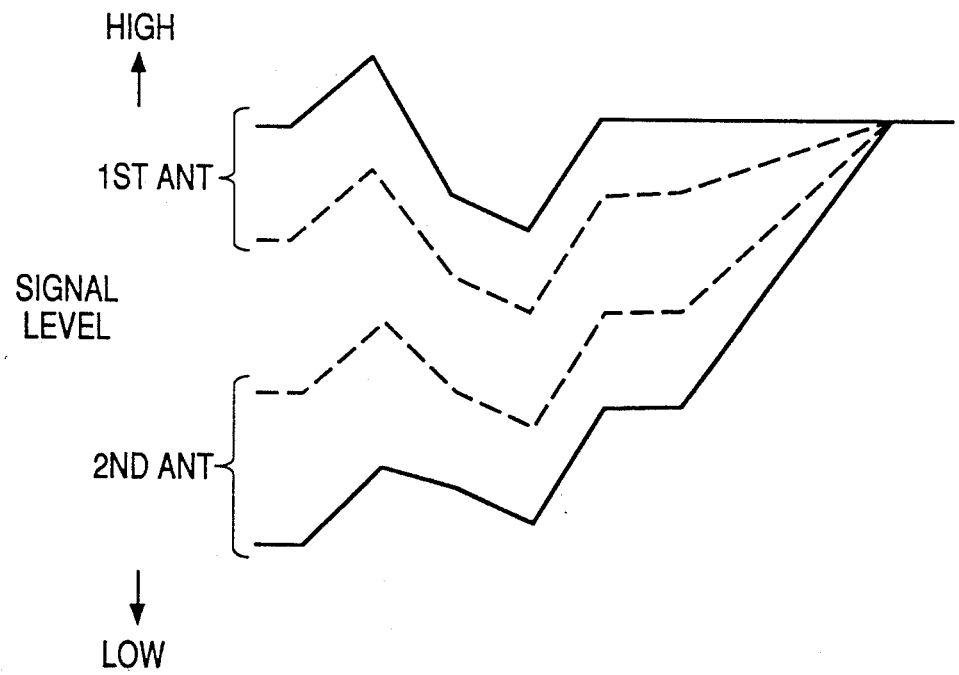

FIGS. 3 show signal levels at each stage of amplifications and attenuations in each receiving circuit of the FIG. 2 circuit configuration. Abscissa of FIG. 3(B) is represented by the FIG. 3(A) blocks. In FIG. 3(B), fluctuations of the received signal levels are indicated by the solid lines and the dotted lines for the first antenna and for the second antenna, respectively. It is observed there that the output levels of AGC IF amplifiers 5A and 15A are always kept constant as predetermined by the control of the attenuations in variable attenuators 2 and 12 for the microwave signals as well as by the control of gain of AGC IF amplifiers 5A and 15A, even when the input signal levels to the pre-amplifiers 1 and 11 are fluctuating. On the other hand, it is also observed that the signal levels at the outputs of IF amplifiers 4 and 14, from which the signals are taken out so as to be combined, are following the signal levels input to the pre-amplifiers 1 and 11. In other words, when the signal level from first antenna is higher than that of the second antenna the output level of IF amplifier 4 of the first receiver circuit is higher than that of the second receiver circuit. Thus, the signal levels to be combined are corresponding to the levels of the signals received by respective antenna. Accordingly, variable attenuators 30 and 31 and their control circuit (indicated by dotted lines in FIG. 1), each employed in prior art circuit configuration, are no more necessary. Output of the combining circuit 32 is the IF signal output of the SD system.

Among microwave signals having fluctuating signal levels due to fading or multipath effect, etc., low level signals are generally inferior in the distortion or S/N ratio, etc,. However, according to the present invention, a first type IF signal of higher level being dominant in the output of the SD system reduces the effect of the unfavorable low level microwave signal, without paying for an expensive AGC IF amplifiers requiring severe specifications and for complicated control circuit to attenuate the once amplified IF signals.

Figure 1:
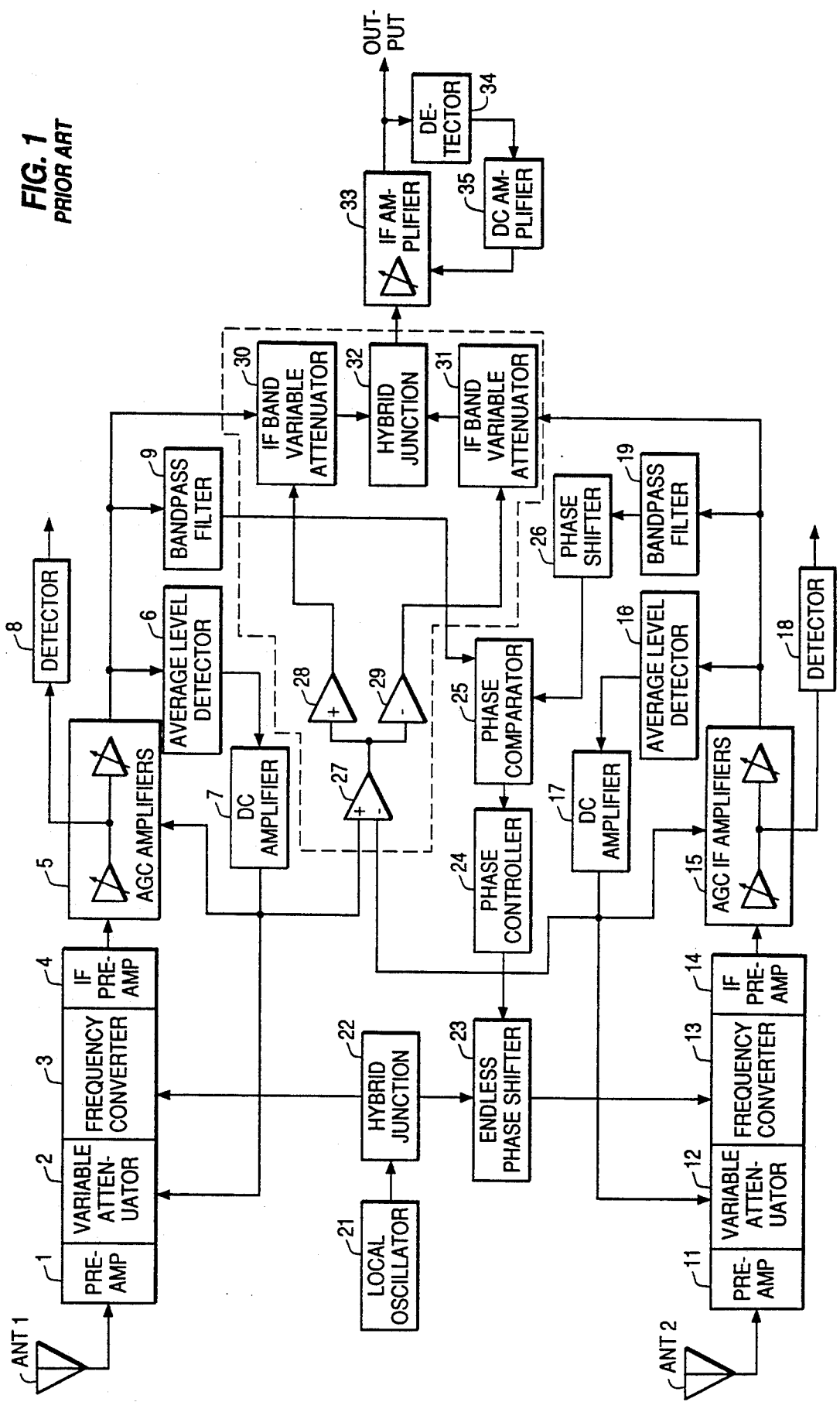
FIG. 1 shows a block diagram of a prior art space diversity reception system.

In the FIG. 2 circuit configuration, the amplifiers 1, 11, 4, 14 and 33 in the main signal routes are required to be as high grade the characteristics as the FIG. 1 prior art circuit configuration; however, AGC IF amplifiers 5A and 15A in the present invention being merely for phase control outside the main signal route do not require such high grade characteristics for the linearity and bandwidth, etc. as those of the main signal route. Therefore, the FIG. 2 configuration contributes to reduce the power consumption of the amplifiers, the size of the circuits and accordingly the cost.

Figure 4:
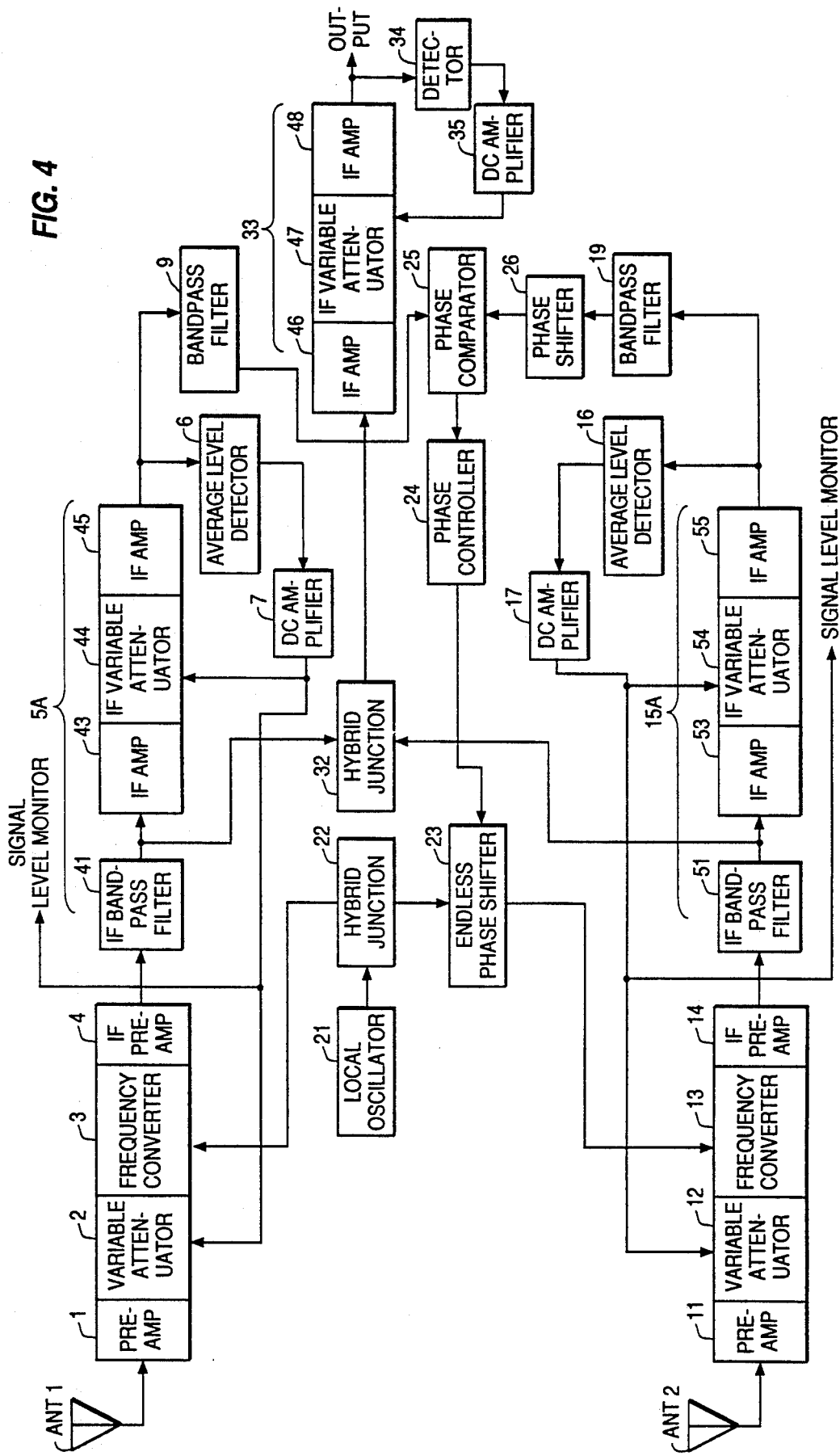
FIG. 4 shows a block diagram of further detail of the FIG. 2 first preferred embodiment.

FIG. 4 shows further detail of the FIG. 2 embodiment of the present invention. The same parts as in FIG. 2 circuit are denoted with the same numerals. The numerals 41 and 51 denote bandpass filters (BPF) for allowing the signals of IF bandwidth to pass. The numerals 43, 53, 45, 55, 46 and 48 denote IF amplifiers (IFA) for amplifying the IF signal band. The numerals 44, 54 and 47 denote variable attenuators (IVA) for attenuating the IF signal band. Thus, in FIG. 4 configuration, AGC IF amplifiers 5A and 15A are respectively constituted with: IF bandpass filter 41 and 51 provided at the out,,outs of the low-noise IF pre-amplifiers 4 and 14, IF amplifiers 43 and 53, variable attenuators 44 and 54 controlled by the AGC signals out-puts from DC amplifiers 7 and 17, and IF amplifiers 45 and 55. Each of the AGC signals is also employed for independently monitoring the signal levels received by each antenna. The third AGC IF amplifier 33 for amplifying the combined IF signal is constituted of IF amplifier 46, variable attenuator 47 and IF amplifier 48, where the attenuation at variable attenuator 46 is controlled by AGC signal output from DC amplifier 35 so as to keep the output level of IF amplifiers 33 constant.

Figure 5:
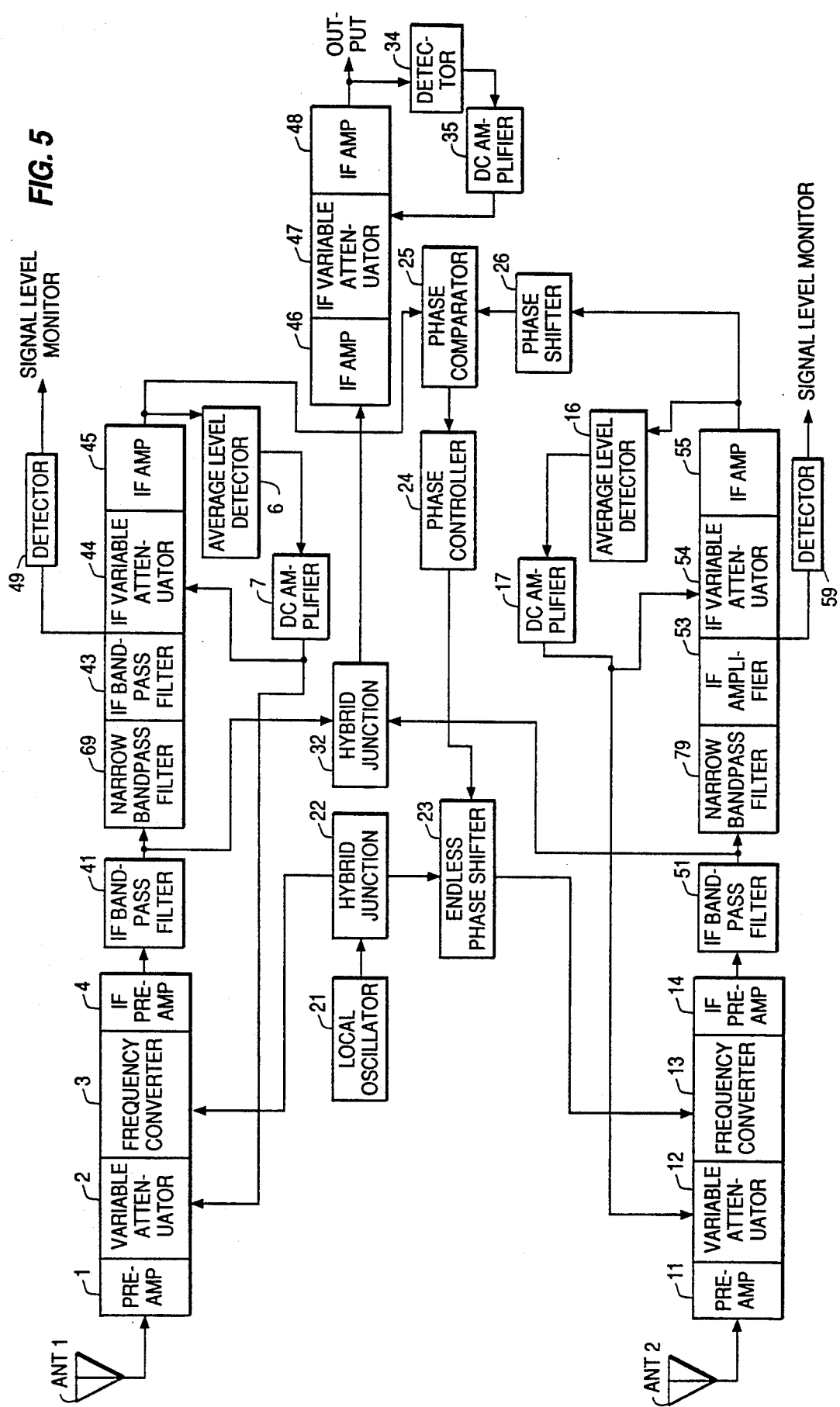
FIG. 5 shows a block diagram of a second preferred embodiment of the present invention.

FIG. 5 shows a second preferred embodiment of the present invention. The same parts as in the FIG. 4 first embodiment are denoted with the same numerals. The FIG. 5 configuration is further provided with narrow bandpass filters 69 and 79 in front of IF amplifiers 43 and 53, for allowing only the carrier component of the IF signals to pass therethrough, so that noise components in the IF signals are reduced in AGC IF amplifiers 5A and 15A. Detectors 49 and 59 detect the outputs from inter-stage IF amplifiers 43 and 53 for independently monitoring the signal levels of the two receiver circuits. These level monitors also enjoy the reduced IF noises, for achieving more accurate monitoring.

Figure 7:
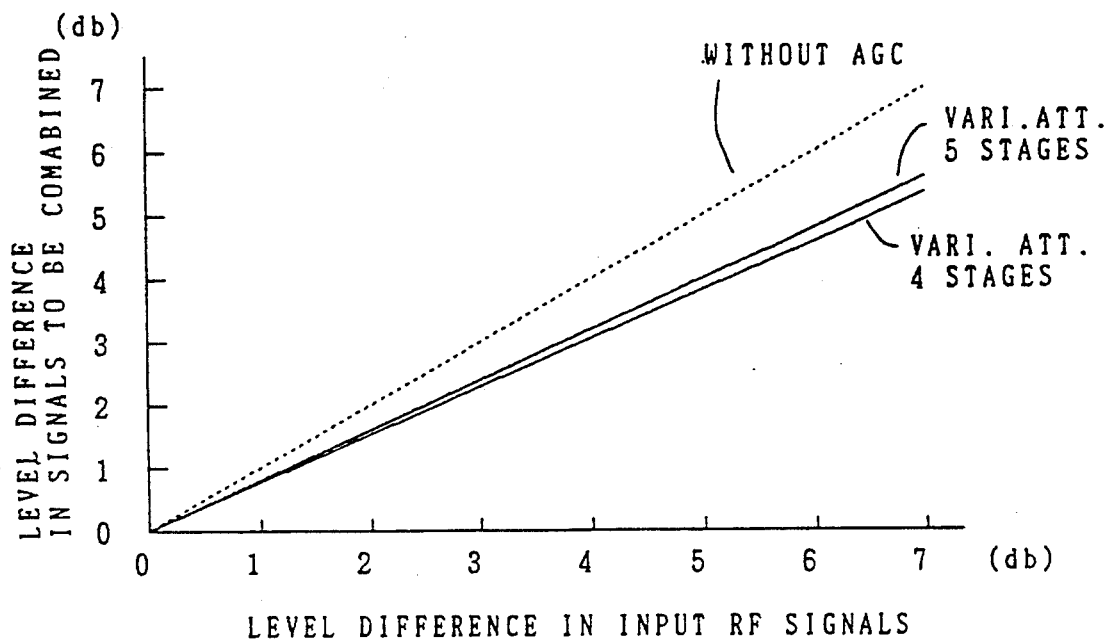
FIGS. 7(A) and 7(B) show difference in signal levels input to the combiner versus received signal level difference.
Figure 7:
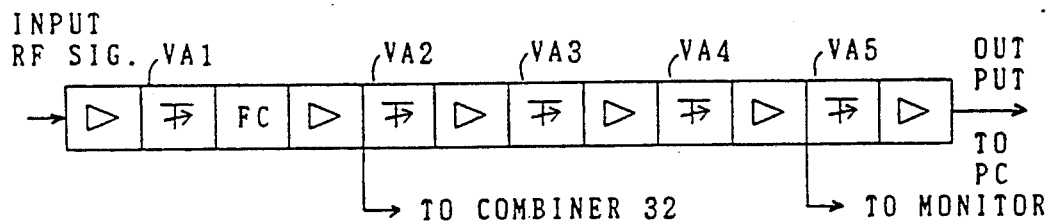

FIG. 7(A) shows typical relations of signal levels output from the AGC IF amplifiers 5A and 15A, signal levels for monitor detection and signal levels to be combined, versus signal level input to the receiver circuit, for the case where the amplifier is composed of a single stage of pre-amplifier, a first variable attenuator, a frequency converter, and five IF amplifiers and four variable attenuators, as shown in FIG. 6. The IF signal to be combined is output from the first IF amplifier, as well as the monitor signal is output from the fourth IF amplifier. It is seen in the figure that, while the AGC IF amplifiers is outputting a constant level signal for the phase comparison for wide dynamic range of the input signal, the signal to be combined and the signal to be monitored are corresponding the input signal level to the receiver.

FIGS. 7(A) and 7(B) show typical relation of difference of IF signal levels to be combined versus difference of microwave signal levels input to the receiver circuits in the case where are employed a single stage of the variable attenuators in the pre-amplifier and four or five stages of variable attenuators in IF amplifiers for establishing AGC feedback loops, according to the circuit configuration of the invention. It is observed that IF signals which correspond to the difference of the signal levels input to each receiver circuit are taken out of each receiver circuit where the signal level difference is a little compressed because the signals are taken out of the stage after merely the first one of the four or five variable attenuators in total.

In addition to the effects of the invention as already described above, there are advantageous effects in the invention as follows. The circuit configuration of the invention is advantageous particularly for receiving a multi-level QAM (Quadrature Amplitude Modulation) signal, because the QAM signal carries multi-channel signals by means of the phase- as well as amplitude-modulation. Accordingly, the amplifiers and the converters must satisfy strict requirements for the linearity in the dynamic range, the phase characteristics, etc. These strict specifications can be achieved in the invention circuit paying less cost, less space and less power consumption. In some prior art circuit configuration where the two receiver circuits are automatically gain-controlled commonly by a common AGC voltage so that the amplification factor of each receiver circuit is equal to each other for outputting the signals to be combined in accordance with the received RF signal levels, the independent monitoring of the input signal level of each receiver circuit must be given up. However, in the circuit configuration of the invention, received signal level of each receiver circuit can be monitored simply and accurately.

Though in the above preferred embodiments the phase control of the two receiving circuits is carried out by detecting the phase difference of the output signals of the AGC IF amplifiers, it is apparent that the phase difference may be detected from other signals than IF, i.e., may be detected from the radio frequency signal.

Though in the above preferred embodiments the phase control of the two receiving circuits is carried out by controlling the phase of the local frequency signal input to the frequency converter, it is apparent that the phase control may carried out by a phase shifter provided in the receiving circuit.

The many features and advantages of the invention are apparent from the detailed specification and thus, it is intended by the appended claims to cover all such features and advantages of the system which fall within the true spirit and scope of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention.

What I claim is:

1. A space diversity reception system for receiving radio frequency signals and outputting a combined signal, comprising:
    a plurality of receiving circuits, each of said receiving circuits comprising:
        a pre-amplifier stage operatively coupled to an associated antenna to preamplify a received radio frequency signal in response to a gain feedback signal and to provide a preamplified signal, and
        an automatic gain-controlled amplifier stage operatively connected to said pre-amplifier stage to receive the preamplified signal and to provide the gain feedback signal to said preamplifier stage and provide a substantially constant level signal;
    a phase comparator operatively coupled to each automatic gain-controlled amplifier stage for comparing phase of each substantially constant level signal and to provide a phase difference signal to at least one particular receiving circuit sufficient to cause said automatic gain-controlled amplifier stages to output the substantially constant level signals in phase with one another; and
    a combining circuit operatively connected to each preamplifier stage to receive and combine each preamplified signal and to output the combined signal from the space diversity reception system.

2. A space diversity reception system as recited in claim 1, wherein each said preamplifier stage comprises a frequency converting circuit for converting the radio frequency signal to an intermediate-frequency signal.

3. A space diversity reception system as recited in claim 2, wherein said diversity reception system further comprises a variable phase shifter operatively coupled to said frequency converting circuit of the at least one particular receiver circuit to provide an adjustable phase local oscillator signal to said frequency converting circuit in response to the phase difference signal.

4. A space diversity reception system as recited in claim 2, wherein each said preamplifier stage further comprises a pre-amplifier operatively coupled between the associated antenna and said frequency converting circuit.

5. A space diversity reception system as recited in claim 4, wherein each preamplifier stage further comprises a variable attenuator operatively coupled between said preamplifier circuit and said frequency converting circuit to variably attenuate in response to the gain feedback signal from said automatic gain-controlled amplifier stage.

6. A space diversity reception system as recited in claim 4, wherein said preamplifier stage further comprises an intermediate frequency amplifier operatively coupled to said frequency converting circuit to provide the preamplified signal.

7. A space diversity reception system for receiving radio frequency signals and outputting a combined signal, comprising:
    a plurality of receiving circuits, each receiving circuit comprising:
        a preamplifier stage operatively coupled to an associated antenna to preamplify a received radio frequency signal in response to a gain feedback signal and to provide a preamplified signal, and
        an automatic gain-controlled amplifier stage operatively connected to said preamplifier stage to receive the preamplified signal and to provide the gain feedback signal to said preamplifier stage and provide a substantially constant level signal;
    a combining circuit operatively connected to each preamplifier stage to receive each preamplified signal and to provide the combined signal; and
    a phase comparator operatively coupled to each automatic gain-controlled amplifier stage to receive each substantially constant level signal and to provide a phase difference signal to at least one particular receiving circuit sufficient to cause said receiving circuits to become in phase with one another.

* * * * *

UNITED STATES PATENT AND TRADEMARK OFFICE
CERTIFICATE OF CORRECTION

PATENT NO. : 5,263,180

DATED : November 16, 1993

INVENTOR(S) : Eiichi Hirayama

It is certified that error appears in the above-identified patent and that said Letters Patent is hereby corrected as shown below:

Col. 1, line 42, "Phase" should be --phase--.

Col. 5, line 15, "FIGS. 3" should be --FIGS. 3(A) and 3(B)--.

Col. 6, line 8, "out,,outs" should be --outputs--;

line 10, "out-puts" should be --outputs--.

Col. 7, line 60, "phase" should be --phases--.

Signed and Sealed this

Twenty-first Day of June, 1994

Attest:

BRUCE LEHMAN

*Attesting Officer*     Commissioner of Patents and Trademarks